United States Patent
PP et al.

(10) Patent No.: US 11,821,974 B2
(45) Date of Patent: Nov. 21, 2023

(54) MULTI-HOP POSITIONING

(71) Applicant: QUALCOMM Incorporated, San Diego, CA (US)

(72) Inventors: Aswin PP, Bengaluru (IN); Sandeep Kumar Verma, Raipur (IN); Sanath Kumar Gampa, Karimnagar (IN)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/244,745

(22) Filed: Apr. 29, 2021

(65) Prior Publication Data

US 2022/0365194 A1    Nov. 17, 2022

(51) Int. Cl.
| | | |
|---|---|---|
| G01S 11/04 | (2006.01) | |
| G01S 5/02 | (2010.01) | |
| H04W 64/00 | (2009.01) | |

(52) U.S. Cl.
CPC ............. *G01S 11/04* (2013.01); *G01S 5/0284* (2013.01); *H04W 64/003* (2013.01)

(58) Field of Classification Search
CPC ........ G01S 11/04; G01S 5/0284; G01S 7/006; G01S 5/12; G01S 13/765; G01S 5/0289;
(Continued)

(56) References Cited

U.S. PATENT DOCUMENTS

| | | | |
|---|---|---|---|
| 2005/0157661 A1* | 7/2005 | Cho ................... | H04W 40/246 370/254 |
| 2014/0162685 A1* | 6/2014 | Edge ................... | H04W 4/023 455/456.1 |

(Continued)

FOREIGN PATENT DOCUMENTS

| | | |
|---|---|---|
| WO | WO 2015116322 A2 | 8/2015 |
| WO | WO 2020146131 A1 | 7/2020 |

OTHER PUBLICATIONS

Huawei., et al., "Discussion on NR Positioning Technologies", 3GPP Draft, 3GPP TSG-RAN WG2 #99, R2-1708210, 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017, XP051318113, 6 Pages, Retrieved from the Internet: URL: http://www.3gpp.org/ftp/Meetings_3GPP_SYNC/RAN2/Docs/ [retrieved on Aug. 20, 2017], Sections 1-3.

(Continued)

*Primary Examiner* — Michael Y Mapa
(74) *Attorney, Agent, or Firm* — Thien T. Nguyen

(57) ABSTRACT

In one aspect, a process for position estimation entails obtaining (a) at least one direct distance estimate corresponding to a distance between one or more intervening devices, (b) at least one direct angle estimate corresponding to a spanning angle formed involving the one or more intervening devices, or both (a) and (b). Based on (a) the at least one direct distance estimate corresponding to the distance between devices including the one or more intervening devices, (b) the at least one direct angle estimate corresponding to the spanning angle formed involving the one or more intervening devices, or both (a) and (b), an indirect distance estimate between a first device and a second device or an indirect angle estimate involving the first device and the second device is determined. The first device and the second device may be out of range with respect to one another for a direct distance measurement.

14 Claims, 11 Drawing Sheets

(58) Field of Classification Search
CPC ... H04W 64/003; H04W 8/005; H04W 24/08; H04W 84/18
USPC .............................................. 455/456.1–457
See application file for complete search history.

(56) References Cited

U.S. PATENT DOCUMENTS

2015/0109407 A1\* 4/2015 Giger ...................... G01S 17/86
 348/36
2017/0184721 A1\* 6/2017 Sun ........................... G01S 7/51
2018/0310133 A1 10/2018 Ramasamy et al.

OTHER PUBLICATIONS

International Search Report and Written Opinion—PCT/US2022/070879—ISA/EPO—Jun. 10, 2022.

\* cited by examiner

700

702

Obtain (a) at least one direct distance estimate corresponding to a distance between devices including one or more intervening devices, (b) at least one direct angle estimate corresponding to a spanning angle formed involving the one or more intervening devices, or both (a) and (b)

704

Based on (a) the at least one direct distance estimate characterizing the distance between devices including the one or more intervening devices, (b) the at least one direct angle estimate characterizing the spanning angle formed involving the one or more intervening devices, or both (a) and (b), determine an indirect distance estimate corresponding to a distance between a first device and a second device or an indirect angle estimate corresponding to a spanning angle formed involving the first device and the second device, the first device and the second device being out of range with respect to one another to make a direct distance measurement between the first device and the second device

802
At a first device, obtain information including (a) at least one direct distance estimate corresponding to a distance between the second device and a third device, (b) at least one direct angle estimate corresponding to a spanning angle formed involving the second device and a third device, or both (a) and (b), from the second device 804
At the first device, determine a position estimate for the first device based on (a) the at least one direct distance estimate corresponding to the distance between the second device and the third device, (b) the at least one direct angle estimate corresponding to the spanning angle formed involving the second device and the third device, or both (a) and (b), wherein the first device and the third device are out of range with respect to one another to make a direct distance measurement between the first device and the third device

FIG. 8

MULTI-HOP POSITIONING

BACKGROUND

Aspects of the disclosure relate to positioning and more specifically to multi-hop positioning or inter-device positioning. Devices in mesh-like arrangements are becoming increasingly widespread. Examples include self-organized networks such as wireless local area network (WLAN) MESH, WLAN neighborhood area network (NAN), etc. In such networks, connections are established between peers, and the process is continued to form a bigger cluster (mesh of peers). The application of these kind of network is vast, including Internet of things (IOT) Mesh, self-organized networks, connected cars, indoor positioning, Bluetooth mesh, etc. In addition, devices not within mesh-like networks, such as stand-alone devices, are also proliferating.

However, determining the position of devices in a mesh-like arrangement as well as stand-alone devices can be difficult to achieve. Traditional techniques are not readily applicable to the new topology of mesh networks or stand-alone devices. There is a need for improved techniques in position determination for devices in newer types of arrangements, including mesh networks.

BRIEF SUMMARY

Methods, apparatus, systems, and computer-readable media are disclosed relating to techniques for position estimation.

In one aspect, a process for position estimation is disclosed. The process involves obtaining (a) at least one direct distance estimate corresponding to a distance between devices including one or more intervening devices, (b) at least one direct angle estimate corresponding to a spanning angle formed involving the one or more intervening devices, or both (a) and (b). The process further involves, based on (a) the at least one direct distance estimate corresponding to the distance between devices including the one or more intervening devices, (b) the at least one direct angle estimate corresponding to the spanning angle formed involving the one or more intervening devices, or both (a) and (b), determining an indirect distance estimate corresponding to a distance between a first device and a second device or an indirect angle estimate corresponding to a spanning angle formed involving the first device and the second device. The first device and the second device may be out of range with respect to one another to make a direct distance measurement between the first device and the second device.

In another aspect, a process for position estimation is disclosed. The process involves, at a first device, obtaining from a second device information including (a) at least one direct distance estimate corresponding to a distance between the second device and a third device, (b) at least one direct angle estimate corresponding to a spanning angle formed involving the second device and a third device, or both (a) and (b). The process further involves, at the first device, determining a position estimate for the first device based on (a) the at least one direct distance estimate corresponding to the distance between the second device and the third device, (b) the at least one direct angle estimate corresponding to the spanning angle formed involving the second device and the third device, or both (a) and (b). The first device and second device may be out of range with respect to one another to make a direct distance measurement between the first device and the second device.

In another aspect, a process for position estimation is disclosed. The process involves, at a first device, obtaining from a second device (a) at least one direct distance estimate corresponding to a distance between the second device and a third device, (b) at least one direct angle estimate corresponding to a spanning angle formed involving the second device and a third device, or both (a) and (b). The process further involves determining a position estimate for the first device based on (a) the at least one direct distance estimate corresponding to the distance between the second device and the third device, (b) the at least one direct angle estimate corresponding to the spanning angle formed involving the second device and the third device, or both (a) and (b). The first device and the third device may be out of range with respect to one another to make a direct distance measurement between the first device and the third device.

In another aspect, a process for position estimation involves (a) determining one or more direct distance estimates, each of the one or more direct distance estimates corresponding to a distance to one of one or more neighboring devices. The process further involves (b) determining one or more direct angle estimates, each of the one or more direct angle estimates corresponding to an angle formed between a pair of neighboring devices from one or more pairs of neighboring devices. The process further involves (c) receiving at least one broadcast message from the one or more neighboring devices. The process further involves (d) extracting one or more indirect distance estimates and one or more indirect angle estimates from the at least one broadcast message received from the one or more neighboring devices. The process further involves (e) updating a local table with (i) the one or more direct distance estimates, (ii) the one or more direct angle estimates, (iii) the one or more indirect distance estimates, and (iv) the one or more indirect angle estimates. The process further involves (f) broadcasting the local table to the one or more neighboring devices. The process further involves (g) repeatedly performing steps (a)-(f).

In another aspect, a process for obtaining a position estimate for a first device is disclosed. The process involves (a) obtaining a distance estimate and an angle of arrival estimate associated with one or more signals transmitted between the first device and a second device. The process further involves (b) obtaining a position estimate for the second device. The process further involves (c) determining a position estimate for the first device based on (i) the distance estimate and the angle of arrival estimate associated with the one or more signals transmitted between the first device and the second device and (ii) the position estimate for the second device. The position estimate for the second device may be based on (i) a distance estimate and an angle of arrival estimate associated with one or more signals transmitted between the second device and a third device and (ii) a position estimate for the third device.

In another aspect, a process for position estimation for a first device is disclosed. The process involves (a) at the first device, obtaining a distance estimate and an angle of arrival estimate associated with one or more signals transmitted between the first device and a second device. The process further involves (b) at the first device, obtaining a position estimate for the second device. The process further involves (c) at the first device, determining a position estimate for the first device based on (i) the distance estimate and the angle of arrival estimate associated with the one or more signals transmitted between the first device and the second device and (ii) the position estimate for the second device. The position estimate for the second device may be based on (i)

a distance estimate and an angle of arrival estimate associated with one or more signals transmitted between the second device and a third device and (ii) a position estimate for the third device.

BRIEF DESCRIPTION OF THE DRAWINGS

Aspects of the disclosure are illustrated by way of example. In the accompanying figures, like reference numbers indicate similar elements.

FIG. 7 is a flow chart illustrating a process for position estimation involving multiple devices, according to an aspect of the disclosure. The multiple devices may include a first device and a second device.

FIG. 8 is a flow chart illustrating a process for position estimation performed at a first device, according to an aspect of the disclosure.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
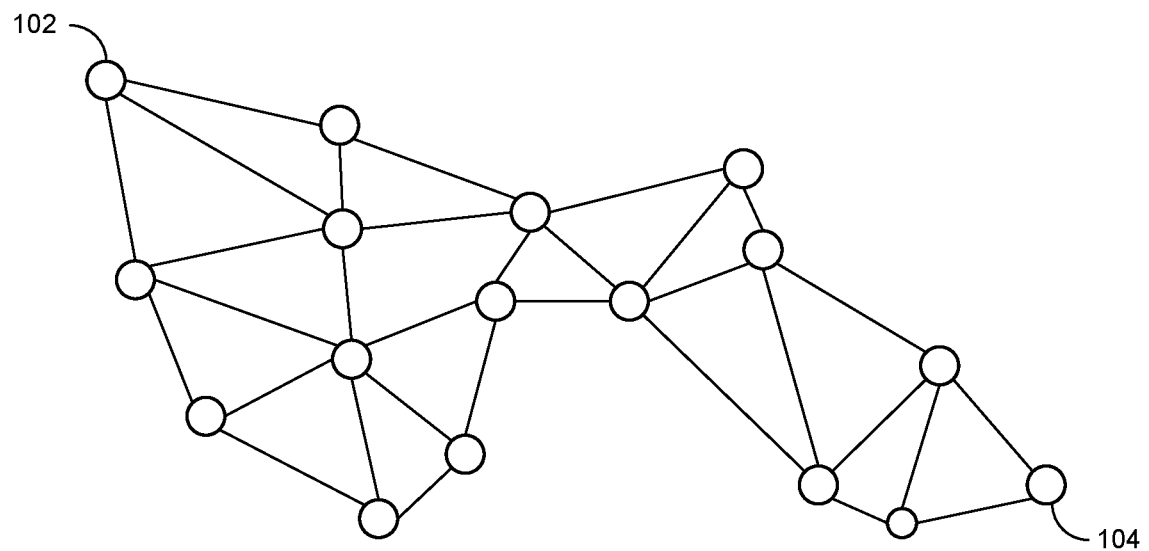
FIG. 1 depicts a mesh network 100 comprising a plurality of devices that connect with one another directly as peers.

FIG. 1 depicts a mesh network 100 comprising a plurality of devices that connect with one another directly as peers. In various embodiments, the mesh network allows devices to connect dynamically and in and non-hierarchically, without relying on a centralized device such as a hub. While mesh network 100 has vast applications, determining the position of devices within such a network can difficult. One challenge is that a device may be out of immediate range (e.g., multiple hops away), such that direct signal measurements cannot be made. For example, device 102 and device 104 are not immediately adjacent to one another. Communication between device 102 and device 104 may require multiple hops through intervening devices. Another challenge is that some devices may not have the capability to determine its own position independently. For example, device 102 may be located outdoors and have the ability to independently determine its position based on a satellite-based positioning technique such as Global Positioning System (GPS). However, device 104 may be located indoors and not have the ability to independently determine its position. Various aspects of the present disclosure allow for the position estimate for device 104 to be determined, based on relative positioning with respect to other devices such as device 102, even though device 102 and device 104 are outside of immediate range from one another.

Aspects of the disclosure may be adopted to provide position estimation for a wide variety of devices. Such a device may be a user equipment (UE). In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. The wireless communication network may comprise, at least in part, a centralized network and/or an ad hoc network. In some examples of a centralized network, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on. Devices in the wireless communication network may communicate with each other and/or to a server (e.g., a location server) by connecting through the centralized network. Alternatively or additionally, the wireless network may comprise, at least in part, an ad hoc network. For example, UEs or devices may connect directly with each other via one or more device-to-device (D2D) peer-to-peer (P2P) links (referred to as "sidelinks"). For example, a UE may have a D2D P2P link with one of the UEs in the network that are connected to one of the base stations (e.g., through which the UE may indirectly obtain cellular connectivity) and a D2D P2P with WLAN device or WLAN station connected to a WLAN access point (AP) (through which UE may indirectly obtain WLAN-based Internet connectivity). In an example, the D2D P2P links may be supported with any well-known D2D RAT, such as LTE Direct (LTE-D), WiFi Direct (WiFi-D), Bluetooth®, and so on.

Figure 2:
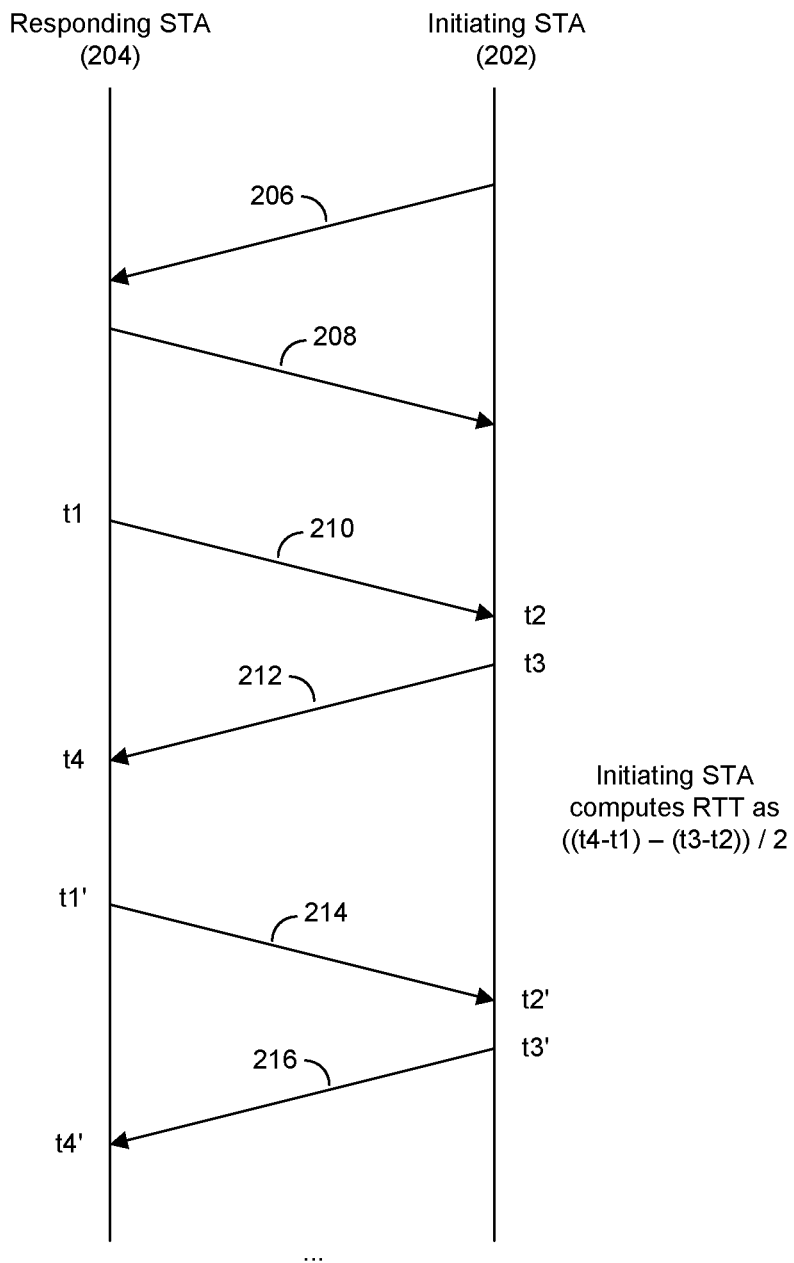
FIG. 2 illustrates a round-trip time (RTT) distance measurement, as a specific example of a ranging measurement.

FIG. 2 illustrates a round-trip time (RTT) distance measurement, as a specific example of a ranging measurement. RTT measures distance between two points based on the time taken by a signal to travel through the air from one point to the other point. The calculation is based on the premise that the duration signal travel is proportional to the actual distance between the two points. Various signals may be used to make the RTT measurements. One example is WiFi signals, but other types of signals can be used. The RTT technique does not rely on the local timestamps (or difference between timestamps), since the internal clocks for the two points are not assumed to be synchronized. Instead, the round-trip time (RTT) can be obtained without having to know the clock offsets. This is done by the addition and subtraction of four times: RTT=((t4−t1)−(t3−t2))/2.

An example is shown in FIG. 2, involving an initiating station (Initiating STA) 202 and a responding station (Responding STA) 204. Here, the RTT sequence is based on WiFi Fine Time Measurement (FTM) messages. The Initiating STA 202 may send an FTM request message 206 to the Responding STA 204, which is followed by a returned acknowledgement (ACK) message 208 in the reverse direction. In response, the Responding STA 204 may send an FTM measurement message 210, which is followed by an ACK message 212 in the reverse direction. Furthermore, the Responding STA 204 may send another FTM measurement message 214, which is followed by an ACK message 216 in the reverse direction. The FTM measurement message 210, ACK message 212, and FTM measurement message 214 may be used to compute an RTT estimate. For instance, the Initiating STA 202 may have local knowledge of the time value of (t3−t2). The Responding STA 204 may have local knowledge of the time difference value (t4−t1). The Responding STA 204 may send the time difference value (t4−t1) as a payload of the FTM measurement message 214 to the Initiating STA 202. Having collected these time difference values, the Initiating STA 202 can compute the RTT value as RTT=((t4−t1)−(t3−t2))/2. An example of the RTT estimate is defined in as part of IEEE 802.11mc standard.

Figure 3:
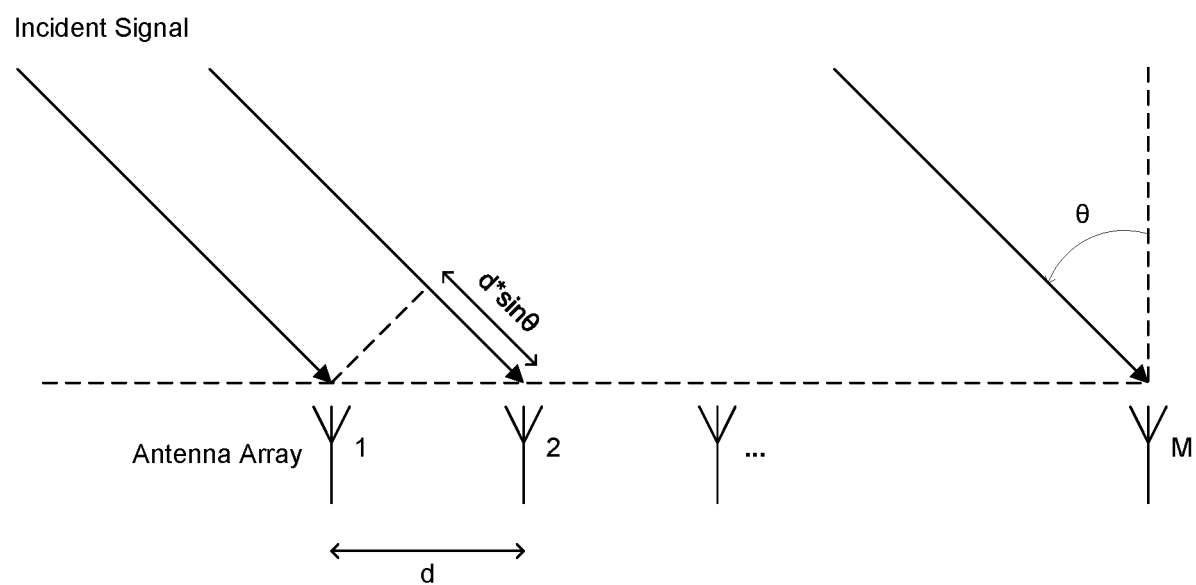
FIG. 3 illustrates an angle of arrival (AoA) measurement according to an embodiment of the disclosure.

FIG. 3 illustrates an angle of arrival (AoA) measurement according to an embodiment of the disclosure. An AoA measurement is based on the difference in arrival times of an incident signal at different elements of an antenna array. For example, the antenna array may be part of each device, as a WLAN device. Conceptually, each antenna element of an antenna array receives a version of the incident signal that has traveled a different path. For if the angle of arrival of the incident signal is θ=0 degree (i.e., direction of travel of incident signal perpendicular to the array of antenna elements), the different paths can be view as having the same or almost the same length. However, if the angle of arrival of the incident signal is θ=a non-zero value, the different paths can be viewed as having different lengths. The different lengths can then be used to calculate the θ, or AoA, based on trigonometric relationships.

Typical computation of the AoA may be performed as given below. The example shown assumes an antenna array that includes M antennas equally spaced by a distance of "d" and a signal arriving at the antenna array through L propagation paths. The incident signal travels a certain distance to reach a first antenna element. An additional distance of "d*sin θ" (shown as "d·sin θ" in the figure) is traveled by the incident signal to reach a second antenna of the array, which is a distance "d" away from the first antenna element. The time delay Δt between the arrival time of the incident signal at the first antenna element and the arrival time of the same incident signal at the second antenna element can be derived from signal processing performed using the signals received from the M elements of the antenna array. For example, such signal processing can be based on cross-correlating the various signals received at the M antenna elements. The signal processing can extract the phase difference between the received signals, which correspond to the time difference Δt. Having multiple antenna elements, M, can boost the signal-to-noise ratio (SNR) of the measurement. Once Δt is found, it can be used to compute the AoA, or θ, using the relationship Δt*c=d*sin θ, which can be rearranged as: θ=sin$^{-1}$(Δt*c/d). Here, c represents the speed of signal propagation, which can be approximated by the speed of light through free space, or 3*10$^8$ meters/second.

Figure 4:
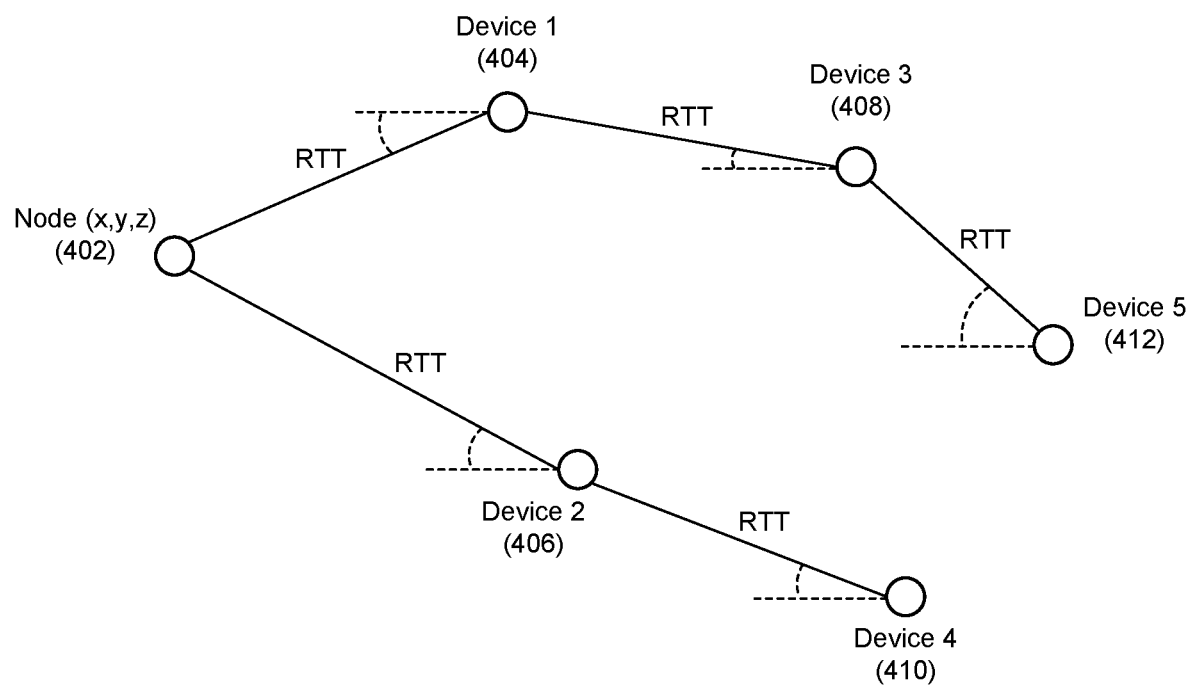
FIG. 4 illustrates an example of multi-hop positioning, by obtaining a position estimate for a device based on a known position estimate for another device, according to an aspect of the disclosure.

FIG. 4 illustrates an example of multi-hop positioning, by obtaining a position estimate for a device based on a known position estimate for another device, according to an aspect of the disclosure. A device 402 ("Node (x,y,z)") has a known position estimate. For example, device 402 may be located outdoors and possess satellite-based positioning capabilities, e.g., GPS, and is able to independently determine its own position. Other devices 404, 406, 408, 410, and 412 (Devices "1" trough "5") do not have known position estimates. For example, they may be located indoors and have not line-of-site to receive satellite-based positioning signals. Devices 1 through 5 may have no GPS capability or have their GPS capabilities disabled or turned off.

As shown in the figure, Devices 1 may obtain its own position estimate relative to Node (x,y,z), by using an RTT distance estimate and an AoA angle estimate. However, other techniques may be used for range and/or angle estimates. Just as an example, one or more signals strength measurements, such as a received signal strength indicator (RSSI) measurement, may be used for range estimates instead of, or in addition to, RTT. Thus, Device 1 is able to compute coordinates for its own position estimate, using (1) the distance estimated between Device 1 and the Node (x,y,z), (2) the angle estimate of the angle at which the signal arrives from the Node (x,y,z), and (3) the known position estimate of Node (x,y,z). In a similar manner, Device 2 may also obtain its own position estimate. Once position estimates have been obtained for Devices 1 and 2, the next set of devices can compute their own position estimates, in similar fashion, from the known position estimates of Devices 1 and 2. For example, Device 3 may obtain its own position estimate based on the known position estimate for Device 1. Device 4 may obtain its own position estimate based on the known position estimate for Device 2. Device 5 may obtain its own position estimate based on the known position estimate for Device 3.

In this manner, starting with the known position estimate for Node (x,y,z), the position estimates of additional device may be successively determined utilizing RTT distance estimates and AoA angle estimates, until position estimates have been obtained for all devices in the mesh network.

The technique illustrated in FIG. 4 can have significant benefits. Oftentimes, the position of a device can only be accurately obtained using GPS when the device is outdoors. The accuracy of GPS is poor indoors, so other technologies are relied on to find the location of devices indoors. Such indoor positioning may be based, for example, on WiFi signals. However, such use of WiFi signals requires already existing infrastructure, e.g., a building equipped WiFi access points. In addition, such WiFi access points may need to be connected to the Internet or have a way to discover their location by some other means, in order for the access points to serve as anchors for positioning devices in the vicinity of the access points. Thus, prior to the present disclosure, if a device wishes to determine its own position, it may need enable GPS or rely on WiFi access points with Internet access. Such requirements may be unavailable or prohibitively costly in many indoor scenarios.

According to aspects of the present disclosure, one node device (e.g., Node (x,y,z) in FIG. 4) which has GPS enabled and not indoors can shares its coordinates over a wireless technology. Other devices (e.g., Devices 1 through 5) can compute their own coordinates by finding the relative position with the node device. This relative position of the devices can be computed using RTT and angle of arrival on any wireless communication signal. One example is WiFi signals. Thus, the devices that are indoors may be able to compute their own coordinates. Once a device computes its own coordinates, it can serve as a node to help other devices within its vicinity to compute their own coordinates. In this manner, even if there is only a single device located outdoors, it can serve as an original anchor to help other devices, e.g., devices located indoors and without GPS capability, to compute coordinates for their own position estimates.

While GPS is used as an example, the present technique may be used to allow a node device (e.g., Node (x,y,z)) having a known position estimate independently determined based on any positioning technology, including satellite-based positioning, cellular-based positioning, RADAR-based positioning, or WiFi-based positioning. If any such positioning technology is available, it can be used to determine the position of the node device. However, the independent positioning technology may be unavailable or unused at other devices (e.g., Devices 1 through 5). Nevertheless, position estimates may be determined for such other devices based on aspects of the present disclosure.

Another benefit of the present disclosure is that no new hardware may need to be installed. An enhancement in the software of existing mobile devices we can implement the features discussed.

Figure 5:
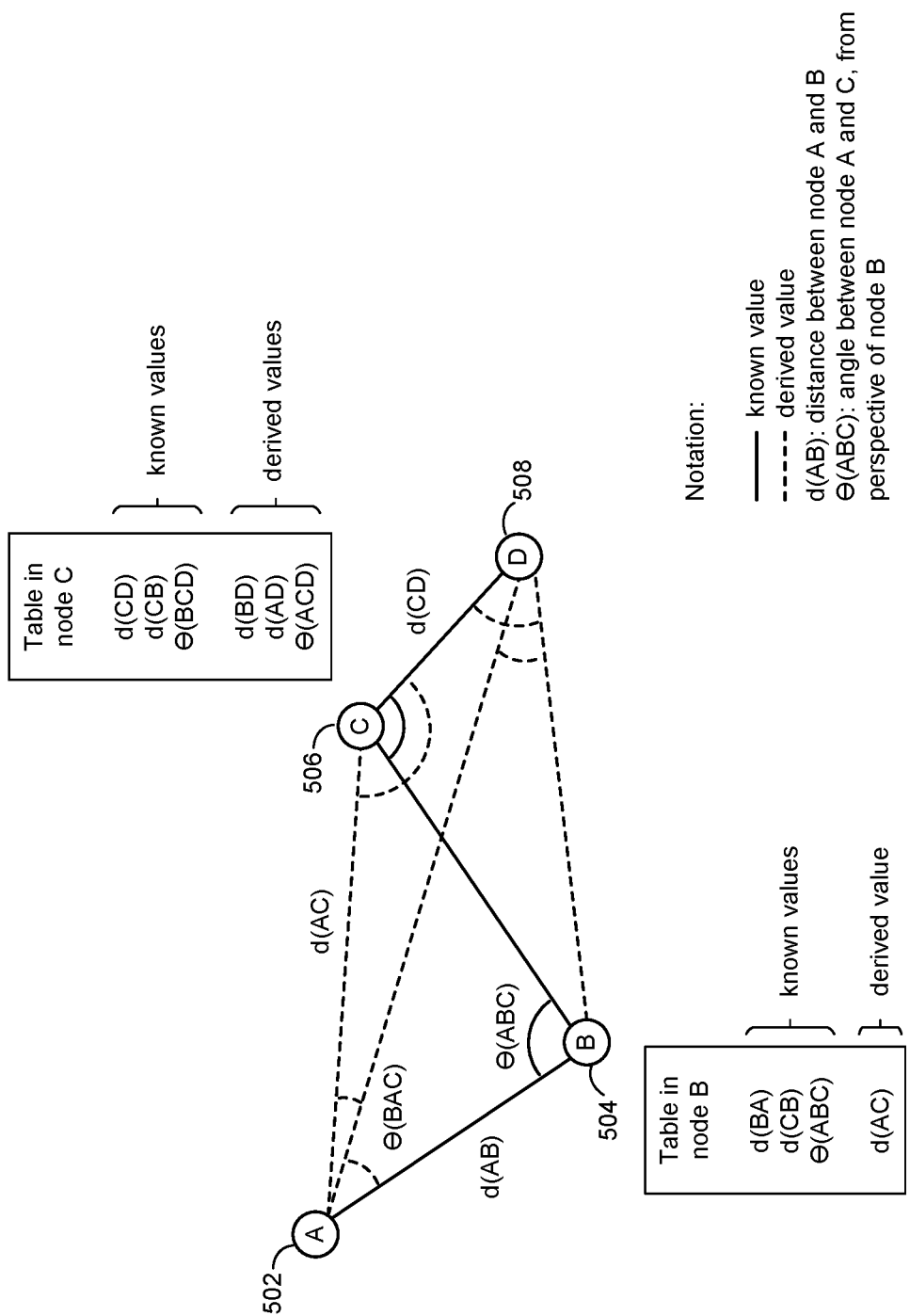
FIG. 5 illustrates an example of multi-hop positioning, by obtaining positioning measurements for out-of-range devices, according to an aspect of the disclosure.

FIG. 5 illustrates an example of multi-hop positioning, by obtaining positioning measurements for out-of-range devices, according to an aspect of the disclosure. A mesh network 500 is shown here as having four nodes for illustrative purposes: Node A (502), Node B (504), Node C (506), and Node D (508). The nodes are positioned such that some nodes are within signaling range of one another, while other nodes are not within signaling range of one another. For example, as shown in the figure, Nodes A and B are within signaling range of each other. Nodes B and C are within signaling range of each other. Nodes C and D are within signaling range of each other. However, nodes A and C are not within signaling range of each other. Nodes B and D are not within signaling range of each other. Also, nodes A and D are not within signaling range of each other.

Different types of range (distance) estimation and angle estimation techniques can be used in accordance with the disclosure. In the present example, RTT is used for range (distance) estimation, and AoA is used for angle estimation. However, other techniques may be used for range and/or angle estimates. Just as an example, one or more signal strength measurements (e.g., received signal strength indicator (RSSI) measurements) may be used for range estimates instead of, or in addition to, RTT measurements. Also, various types of signals may be used as the propagated signal used for measurement, e.g., in RTT and AoA measurements. For simplicity of illustration, WiFi signals may be used for both RTT and AoA measurements. However, RTT, AoA, and other ranging and angle estimation techniques may employ different types of signals. In the example shown in FIG. 5, nodes are said to be "within signaling range" or "not within signaling range" of one another. This may refer to the range of signaling for RTT and AoA purposes, for ease of explanation.

Position estimate for the various nodes may be obtained based on the distances between the nodes and angles formed between pairs of nodes. As mentioned above, some nodes are within signaling ranging of one another. In such cases, direct distance estimates between nodes (e.g., via RTT, signal strength measurement(s), e.g., RSSI, or both RTT and signal strength measurements) and direct angle estimates between nodes can be determined (e.g., via AoA). However, other nodes are not within signaling range of one another. In such cases, direct distance and angle estimates cannot be determined. Instead, indirect distance and angle estimates are determined, according to aspects of the present disclosure.

Knowledge of the direct and indirect distance and angle estimates can be propagated through the mesh network 500. Each node may maintain a local table containing entries for distance estimates and angle estimates. The entries may include direct distance estimates and direct angle estimates made by the node or by other nodes. The entries may also include indirect distancer estimates and indirect angle estimates, which are not measure but are computed from other distance and/or angle estimates. Each node periodically sends out a broadcast message containing the contents of its local table. The broadcast message reaches other nodes in the vicinity within communication range. Each node also receives broadcast messages sent by other nodes, extracts information from such received messages, and use the information to update its own local table. In this manner, distance and angle estimate information can propagate throughout the mesh network 500, and distance and/or angle estimate between nodes that are out of range from one another can be determined.

For example, referring again to FIG. 5, Node A and Node D are not within signaling range of one another. Steps 1 through 10 below illustrates how direct distance and angle measurements can be combined with indirect distance and angle estimates to determine the distance between Node A and Node D:

Step 1: Each node individually determines relative distance of nearby nodes via RTT. For example, Node A may determine d(AB), Node B may determine d(BA) and d(BC), etc. Here, the notation "d(AB)" stands for the distance between Node A and Node B.

Step 2: Each node individually determines the relative angle between each pair of two nearby nodes using AoA. For example, Node B may determine θ(ABC), and Node C may determine θ(BCD), etc. Here, the notation "θ(ABC)" stands for the angle formed by the pair of Node A and Node C, as seen from the perspective of Node B.

Step 3: Node B derives distance between node A and C, d(AC), by using available info within node B. The available info (e.g., table) within Node B may comprise, for example, d(BA), d(CB), and θ(ABC)). The distance d(AC) may be determined by the equation:

$$d(AC) = \sqrt{d(AB)^2 + d(BC)^2 - (2*d(AB)*d(BC)*\cos\Theta(ABC))}$$

Node B may update its own neighbor table with all available information and broadcast the update Step 4: Nodes A and C (neighbor nodes) may get the update (neighbor table) from Node B. The update may include, for example, the distance d(AC).

Step 5: Repeat Steps 3-4 for all nodes.

Step 6: At Node A, d(AB), d(BC), and d(AC) are available. Now Node A can calculate θ(BAC), by using the following equation:

$$\theta(BAC) = \cos^{-1}\left(\frac{(d(AB)^2 + d(BC)^2 - d(AC)^2)}{2*d(AB)*d(BC)}\right)$$

Similarly, Node B can calculate θ(ACB).

Step 7: At Node C, θ(BCD) is available. Note that θ(ACB) was previously calculated in step 5. Now θ(ACD) can also be calculated, by using the equation:

θ(ACD)=θ(BCD)+θ(ACB)

Step 8: Now Node C has all the information needed to calculate d(AD) (using a similar formula as mentioned in Step 3).

Step 9: Node C broadcasts all derived value to nearby nodes. Now node A and D have d(AD).

As shown in FIG. 5, the local table at Node B may contain the following known distance and angle estimates: d(BA), d(CB), θ(ABC), as well as the following derived distance estimate: d(AC). The local table at Node C may contain the following known distance and angle estimates: d(CD), d(CB), and θ(BCD), as well as the following derived distance and angle estimates: d(BC), d(AD), θ(ACD).

Figure 6:
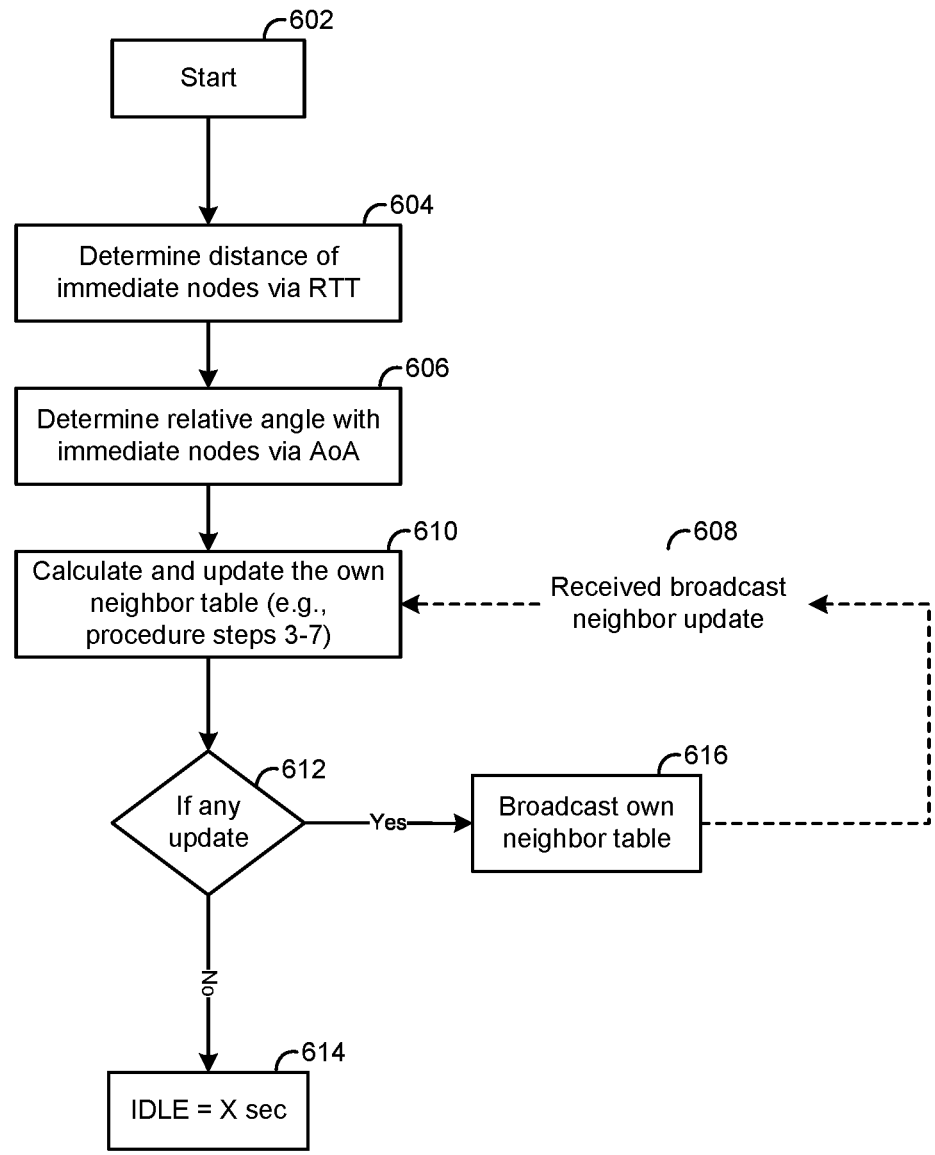
FIG. 6 is a flow chart showing illustrative steps of a process performed at each node within the mesh network shown in FIG. 5, according to an aspect of the disclosure.

FIG. 6 is a flow chart showing illustrative techniques of a process 600 performed at each node within the mesh network shown in FIG. 5, according to an aspect of the disclosure. Each node may represent, for example, a UE in the mesh network. The process starts at 602. At 604, the node determines the distance between it and each node in the immediate vicinity, e.g., nodes that are within signaling range. The distance estimates can be made using RTT or using signal strength measures (e.g., Received Signal Strength Indicator (RSSI), or both. At 606, the node determines the relative angle of pairs of nodes in the immediate vicinity, e.g., nodes that are within signaling range. The angle estimates can be made using AoA. At 608, the node may receive messages broadcast from neighboring nodes and extract distance and angle information from such received messages. At 610, the node may update its local table with any new distance and angle estimates obtained from 604, 606, and 608. At 612, the node may determine whether an update broadcast is necessary. If not, the process proceeds to 614, at which an idle time of X seconds may be implemented. If so, the process proceeds to 616, at which the node sends a broadcast message containing the contents of the local table to neighboring nodes. The process 600 is repeatedly performed (e.g., each iteration followed by an idle time of X seconds). In this manner, position information such as distance(s) and/or angle(s) between nodes can be communicated and maintained in a decentralized fashion over the mesh network. Nevertheless, in some embodiments, position information obtained in this manner may be reported to a more centralized entity. For example, one or more of the nodes within the mesh network may provide information it its neighborhood table to a location server.

Aspects of the present disclosure provides many benefits. While indoor positioning may be achieved via RTT and AoA, such calculations are typically limited to a node and its immediate vicinity. Techniques described herein facilitate multi-hop positioning, in mesh-like networks (e.g., WiFi Mesh, Bluetooth Mesh, IOT Mesh networks), by making it possible to derive distance an angle estimates between two remote nodes that are not in direct vicinity of one another. The presently described techniques may be applicable to all the wireless technologies including WiFi, Wireless mesh, WiFi NAN, Bluetooth, etc., as well as self-organized networks such as WLAN MESH, WLAN NAN, where the connections are established between peers in a distributive manner, to form bigger clusters (Mesh of peers). Positioning based on aspects of the present disclosure have wide applicability to networks such as IOT Mesh, self-organized network, connected car, indoor positioning, Bluetooth mesh, etc.

FIG. 7 is a flow chart illustrating a process 700 for position estimation involving multiple devices, according to an aspect of the disclosure. The multiple devices may include a first device and a second device. At 702, (a) at least one direct distance estimate corresponding to a distance between devices including one or more intervening devices, (b) at least one direct angle estimate is obtained corresponding to a spanning angle formed involving the one or more intervening devices, or both (a) and (b) may be obtained. Referring back to FIG. 5, for example, Node A may determine direct distance estimate (AB), and Node B may determine direct distance estimates d(BA) and d(BC). Also, Node B may determine direct angle estimate θ(ABC), and Node C may determine direct angle estimate θ(BCD). Next, at 704, an indirect distance estimate is obtained corresponding to a distance between the first device and the second device, or an indirect angle estimate is obtained corresponding to a spanning angle formed involving the first device and the second device. The indirect distance estimate or the indirect angle estimate may be determined based on (a) the at least one direct distance estimate corresponding to the distance between devices including the one or more intervening devices, (b) the at least one direct angle estimate corresponding to the spanning angle formed involving the one or more intervening devices, or both (a) and (b). Referring again to FIG. 5, for example, Node B may determine the indirect distance estimate d(AC). Also, Node A may determine the indirect angle estimate θ(BAC), Node B may determine the indirect angle estimate θ(ACB), and Node C may determine the indirect angle estimate θ(ACD). Here, the first device and the second device are out of range with respect to one another to make a direct distance measurement between the first device and the second device. Referring once again to FIG. 5, for example, Node A and Node D may be out of range with respect to one another to make a direct distance measurement. Means for performing the obtaining of (a) at least one direct distance estimate is obtained corresponding to a distance between devices including one or more intervening devices, (b) at least one direct angle estimate corresponding to a spanning angle formed involving the one or more intervening devices, or both (a) and (b) may comprise, for example, one or more transceivers such as a wireless communication interface 1130 (discussed in later sections) and/or one or more one or more processing units such as processing unit(s) 1110 (discussed in later sections). Means for determining the indirect distance estimate or the indirect angle estimate may comprise, for example, one or more processing units such as processing unit(s) 1110.

FIG. 8 is a flow chart illustrating a process 800 for position estimation performed at a first device, according to an aspect of the disclosure. Multiple devices may be involved, including the first device and a second device. At 802, at the first device (e.g., Node D), information including (a) at least one direct distance estimate corresponding to a distance between the second device (e.g., Node C) and a third device (e.g., Node B or Node A), (b) at least one direct angle estimate corresponding to a spanning angle formed involving the second device and a third device, or both (a) and (b), may be obtained from the second device. Referring back to FIG. 5, for example, Node A may determine direct distance estimate d(AB), and Node B may determine direct distance estimates d(BA) and d(BC). Also, Node B may determine direct angle estimate θ(ABC), and Node C may determine direct angle estimate θ(BCD) and direct distance estimate d(CB). Next, at 804, at the first device, a position estimate for the first device is determined based at least in part on (a) the at least one direct distance estimate corresponding to the distance between the second device and the third device, (b) the at least one direct angle estimate corresponding to the spanning angle formed involving the second device and the third device, or both (a) and (b). Referring again to FIG. 5, Node D may determine its position based on the information received from Node C (e.g., direct distance estimate d(CB) and/or direct angle estimate θ(BCD)). Node D can also determine a direct distance estimate d(DC) with respect to Node C. Node D may use the information obtained from Node C (e.g., d(CB) and θ(BCD)) and the direct distance estimate d(DC) that it determines to determine the distance between Node D and Node B d(DB) and the angle θ(CDB). In this embodiment, the estimate position of Node D can be determined based on the information received from Node C and the distance estimate and/or the angle estimate determined by Node D. In addition, referring again to FIG. 5, for example, Node B may determine the indirect distance estimate d(AC). Also, Node A may determine the indirect angle estimate θ(BAC), Node B may determine the indirect angle estimate θ(ACB), and Node C may determine the indirect angle estimate θ(ACD). In one embodiment, the direct and indirect distance estimates and the direct and indirect angle estimates obtained or determined by Node C, Node B, and/or Node A can be provided by Node C to Node D. Here, the first device (node D) and the third device (node B or Node A) are out of range with respect to one another to make a direct distance measurement between the first device and the third device. Referring once again to FIG. 5, for example, Node A and Node D may be out of range with respect to one another to make a direct distance measurement. Similarly, Node B and Node D may be out of range with respect to one another to make a direct distance measurement. Means for performing the obtaining of (a) at least one direct distance estimate is obtained corresponding to a distance between devices including one or more intervening devices, (b) at least one direct angle estimate corresponding to a spanning angle formed involving the one or more intervening devices, or both (a) and (b) may comprise, for example, one or more transceivers such as a wireless communication interface 1130 (discussed in later sections) and/or one or more processing units such as processing unit(s) 1110 (discussed in later sections). Means for determining the indirect distance estimate or the indirect angle estimate may comprise, for example, one or more processing units such as processing unit(s) 1110.

Figure 9:
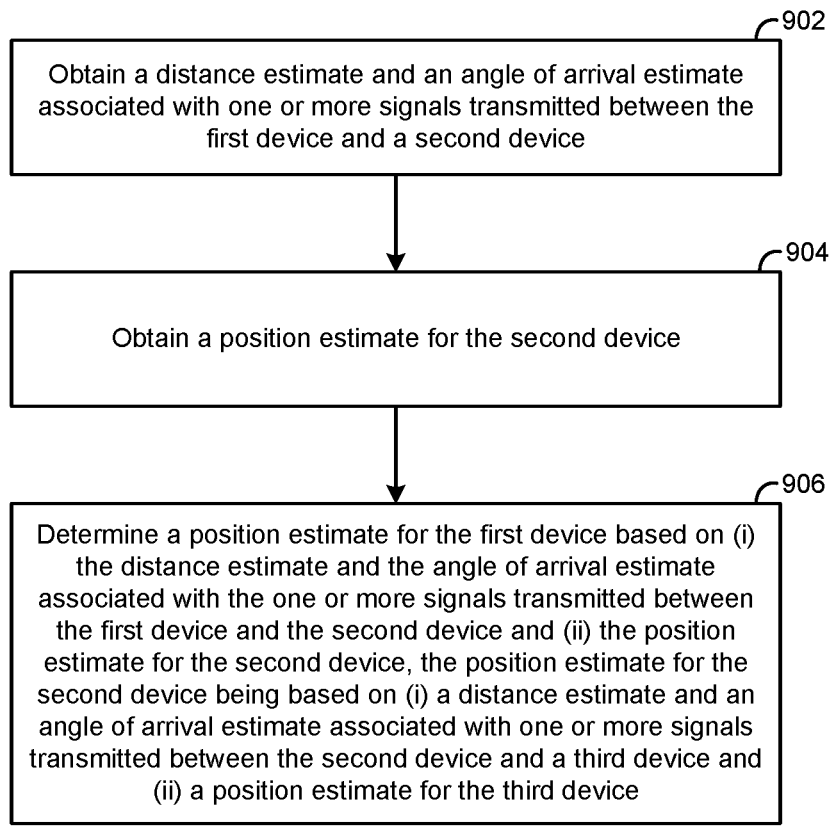
FIG. 9 is a flow chart illustrating a process for position estimation for a first device, according to an aspect of the disclosure.

FIG. 9 is a flow chart illustrating a process 900 for position estimation for a first device, according to an aspect of the disclosure. At 902, a distance estimate and an angle of arrival estimate associated with one or more signals transmitted between the first device and a second device are obtained. Referring to FIG. 4, an example of the first device may be Device 5 (412), and an example of the second device may be Device 3 (408). A distance estimate based on RTT and an angle of arrival (AoA) estimate associated with one or more signals transmitted between Device 5 (412) and Device 3 (408) are obtained. At 904, a position estimate for the second device is obtained. Referring to FIG. 4, the position estimate for Device 3 (408) (the second device) may be obtained by Device 5 (412) (the first device). At a step 906, a position estimate is determined for the first device based on (i) the distance estimate and the angle of arrival estimate associated with the one or more signals transmitted between the first device and the second device and (ii) the position estimate for the second device. Referring to FIG. 4, the position estimate for Device 5 (412) (the first device) is determined based on (i) the RTT distance estimate and the AoA estimate associated with the one or more signals transmitted between Device 5 (412) (the first device) and Device 3 (408) (the second device) and (ii) the position estimate for Device 3 (408). Here, the position estimate for the second device is based on (i) a distance estimate and an angle of arrival estimate associated with one or more signals transmitted between the second device and a third device and (ii) a position estimate for the third device. Referring once again to FIG. 4, an example of the third device may be Device 1 (404). Thus, the position estimate for Device 3 (408) (the second device) is based on (i) a distance estimate and an angle of arrival estimate associated with one or more signals transmitted between Device 3 (408) (the second device) and Device 1 (404) (the third device) and (ii) a position estimate for Device 1 (404) (the third device). Means for obtaining the distance estimate and angle of arrival estimate associated with one or more signals transmitted between the first device and the second device may comprise, for example, one or more transceivers such as a wireless communication interface 1130 (discussed in later sections) and/or one or more one or more processing units such as processing unit(s) 1110 (discussed in later sections). Means for obtaining the position estimate for the second device may comprise, for example, one or more one or more processing units such as processing unit(s) 1110. Means for determining the position estimate for the first device based on one or more transceivers such as a wireless communication interface 1130 (discussed in later sections) and/or one or more one or more processing units such as processing unit(s) 1110.

Figure 10:
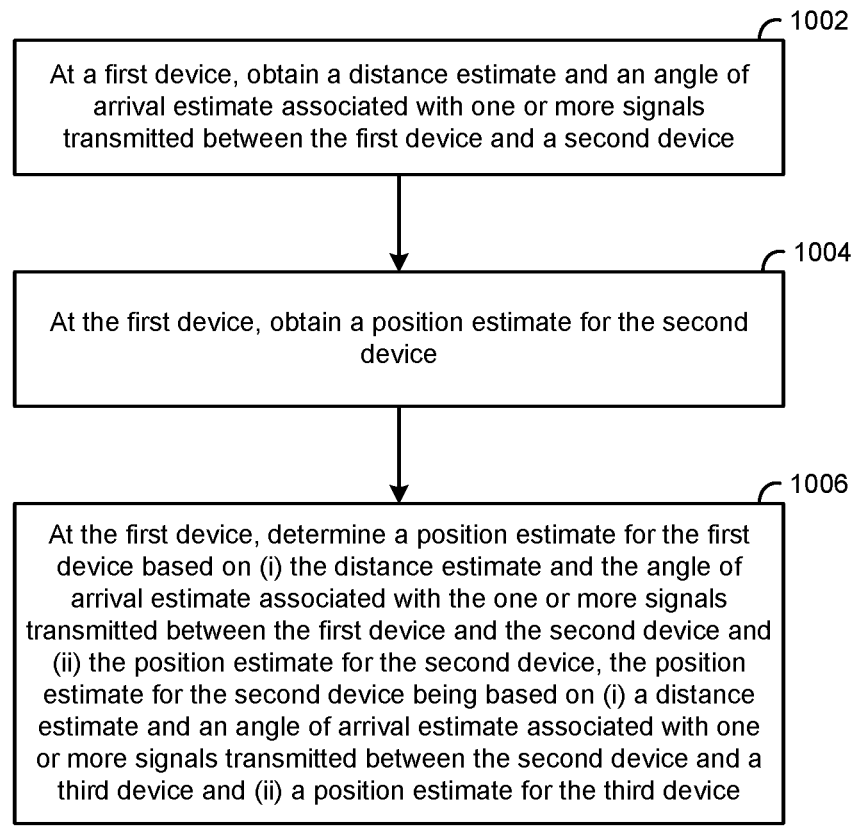
FIG. 10 is a flow chart illustrating a process for position estimation for a first device, performed at the first device, according to an aspect of the disclosure.

FIG. 10 is a flow chart illustrating a process 1000 for position estimation for a first device, performed at the first device, according to an aspect of the disclosure. At 1002, at the first device, a distance estimate and an angle of arrival estimate associated with one or more signals transmitted between the first device and a second device are obtained. Referring to FIG. 4, an example of the first device may be Device 5 (412), and an example of the second device may be Device 3 (408). A distance estimate based on RTT and an angle of arrival (AoA) estimate associated with one or more signals transmitted between Device 5 (412) and Device 3 (408) are obtained. At 1004, at the first device, a position estimate for the second device is obtained. Referring to FIG. 4, the position estimate for Device 3 (408) (the second device) may be obtained by Device 5 (412) (the first device). At 1006, at the first device, a position estimate is determined for the first device based on (i) the distance estimate and the angle of arrival estimate associated with the one or more signals transmitted between the first device and the second device and (ii) the position estimate for the second device. Referring to FIG. 4, the position estimate for Device 5 (412) (the first device) is determined based on (i) the RTT distance estimate and the AoA estimate associated with the one or more signals transmitted between Device 5 (412) (the first device) and Device 3 (408) (the second device) and (ii) the position estimate for Device 3 (408). Here, the position estimate for the second device is based on (i) a distance estimate and an angle of arrival estimate associated with one or more signals transmitted between the second device and a third device and (ii) a position estimate for the third device. Referring once again to FIG. 4, an example of the third device may be Device 1 (404). Thus, the position estimate for Device 3 (408) (the second device) is based on (i) a distance estimate and an angle of arrival estimate associated with one or more signals transmitted between Device 3 (408) (the second device) and Device 1 (404) (the third device) and (ii) a position estimate for Device 1 (404) (the third device). Means for obtaining the distance estimate and angle of arrival estimate associated with one or more signals transmitted between the first device and the second device may comprise, for example, one or more transceivers such as a wireless communication interface 1130 (discussed in later sections) and/or one or more one or more processing units such as processing unit(s) 1110 (discussed in later sections). Means for obtaining the position estimate for the second device may comprise, for example, one or more one or more processing units such as processing unit(s) 1110. Means for determining the position estimate for the first device based on one or more transceivers such as a wireless communication interface 1130 (discussed in later sections) and/or one or more one or more processing units such as processing unit(s) 1110.

Figure 11:
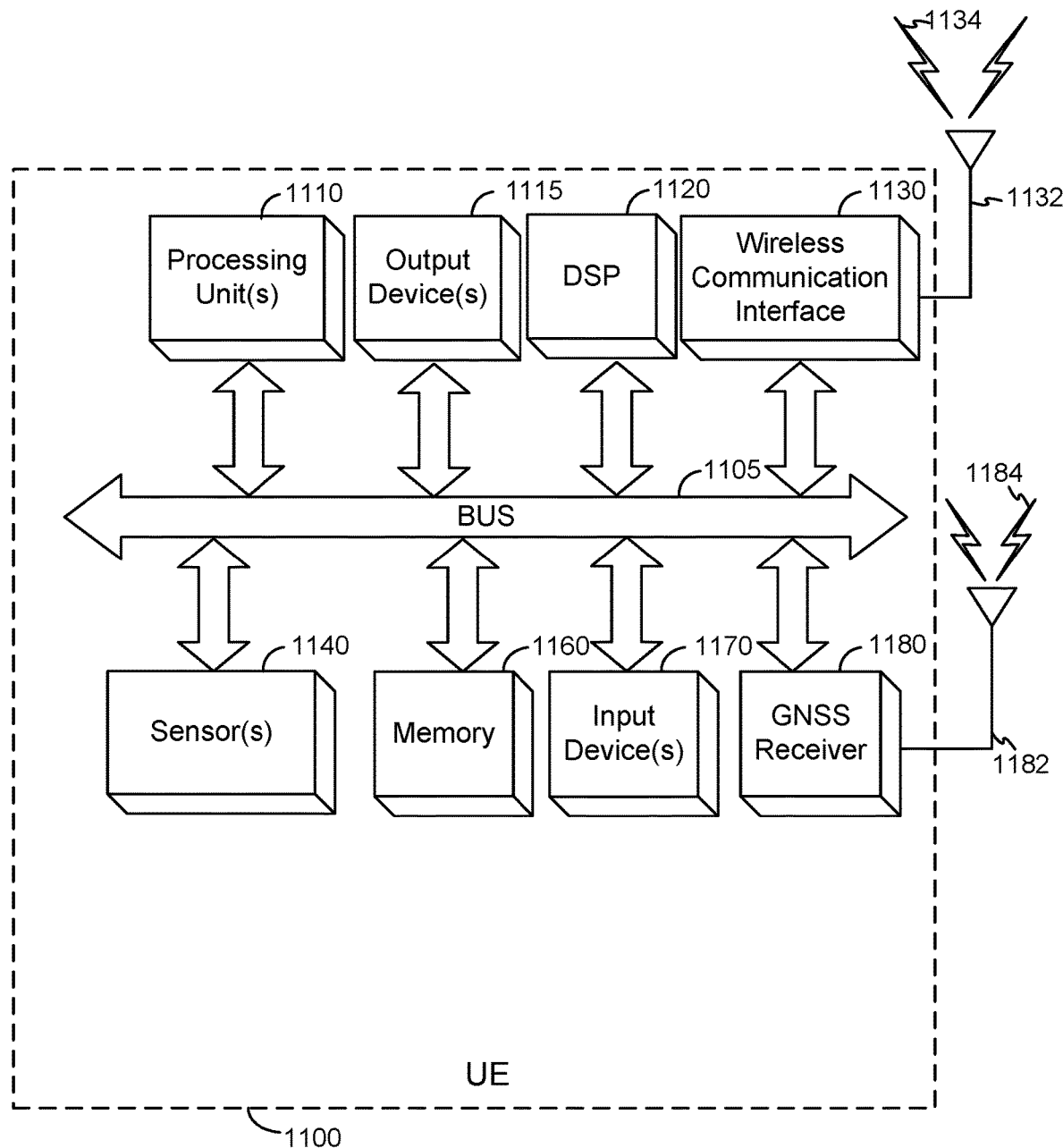
FIG. 11 illustrates an embodiment of a user equipment (UE) representative of devices described in prior figures.

FIG. 11 illustrates an embodiment of a user equipment (UE) 1100, which can be utilized as described herein above. For example, the UE 1100 may be representative of the components and functionality available in each of the devices 402, 404, 406, 408, 410, and 412 shown in FIG. 4, as well as each of the devices 502, 504, 506, and 508 shown in FIG. 5. It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Furthermore, as previously noted, the functionality of the device(s) discussed in the previously described embodiments may be executed by one or more of the hardware and/or software components illustrated in FIG. 11.

The UE 1100 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below). The UE 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The UE 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1100 to communicate with other devices as described in the embodiments above. The wireless communication interface 1130 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1100 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1100 can further include sensor(s) 1140. Sensors 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1100 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the UE 1100, using conventional techniques, from GNSS satellites X110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1110, DSP 1120, and/or a processing unit within the wireless communication interface 1130 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1110 or DSP 1120.

The UE 1100 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the UE 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the UE 1100 (and/or processing unit(s) 1110 or DSP 1120 within UE 1100). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for position estimation, the method comprising: obtaining (a) at least one direct distance estimate corresponding to a distance between devices including one or more intervening devices, (b) at least one direct angle estimate corresponding to a spanning angle formed involving the one or more intervening devices, or both (a) and (b); based on (a) the at least one direct distance estimate corresponding to the distance between devices including the one or more intervening devices, (b) the at least one direct angle estimate corresponding to the spanning angle formed involving the one or more intervening devices, or both (a) and (b), determining an indirect distance estimate corresponding to a distance between a first device and a second device or an indirect angle estimate corresponding to a spanning angle formed involving the first device and the second device, wherein the first device and the second device are out of range with respect to one another to make a direct distance measurement between the first device and the second device.

Clause 2. The method of clause 1, wherein obtaining (a) the at least one direct distance estimate, (b) the at least one direct angle estimate, or both (a) and (b) comprises: receiving one or more broadcast messages sent from at least one of the one or more intervening devices; and extracting (a) the at least one direct distance estimate, (b) the at least one direct angle estimate, or both (a) and (b) from the one or more broadcast messages.

Clause 3. The method of clause 1 or 2, wherein the indirect distance estimate is determined based on two direct distance estimates made by an intervening device from the one or more intervening devices and a direct angle estimate made by the intervening device.

Clause 4. The method of clause 1 or 2, wherein the indirect distance estimate is determined based on a direct distance estimate made by an intervening device from the one or more intervening devices, an indirect distance estimate obtained by the intervening device from one or more broadcast messages, a direct angle estimate made by the intervening device, and an indirect angle estimate obtained by the intervening device from the one or more broadcast messages.

Clause 5. The method of clause 1 or 2, wherein the indirect angle estimate is determined based on two direct distance estimates made by an intervening device from the one or more intervening devices and an indirect angle estimate obtained by the first device from one or more broadcast messages.

Clause 6. The method of clause 1 or 2, wherein the indirect angle estimate is determined based on a direct angle estimate made by an intervening device from the one or more intervening devices and an indirect angle estimate obtained by the intervening device from one or more broadcast messages.

Clause 7. The method of any of clauses 1-6, wherein the at least one direct distance estimate is based on one or more round trip time (RTT) measurements performed at an intervening device from the one or more intervening devices, one or more signal strength measurements performed at the intervening device, or a combination of RTT and signal strength measurements.

Clause 8. The method of any of clauses 1-7, wherein the at least one direct angle estimate is based on one or more angle of arrival (AoA) measurements performed at an intervening device from the one or more intervening devices.

Clause 9. An apparatus for position estimation, the apparatus comprising: at least one wireless transceiver; a memory; and at least one processor communicatively coupled to the at least one wireless transceiver and the memory, wherein the processor is configured to: obtain (a) at least one direct distance estimate corresponding to a distance between devices including one or more intervening devices, (b) at least one direct angle estimate corresponding to a spanning angle formed involving the one or more intervening devices, or both (a) and (b), based on (a) the at least one direct distance estimate corresponding to the distance between devices including the one or more intervening devices, (b) the at least one direct angle estimate corresponding to the spanning angle formed involving the one or more intervening devices, or both (a) and (b), determine an indirect distance estimate corresponding to a distance between a first device and a second device or an indirect angle estimate corresponding to a spanning angle formed involving the first device and the second device, wherein the first device and the second device are out of range with respect to one another to make a direct distance measurement between the first device and the second device.

Clause 10. The apparatus of clause 9, wherein the at least one processor is configured to obtain (a) the at least one direct distance estimate, (b) the at least one direct angle estimate, or both (a) and (b) by: receiving one or more broadcast messages sent from at least one of the one or more intervening devices; and extracting (a) the at least one direct distance estimate, (b) the at least one direct angle estimate, or both (a) and (b) from the one or more broadcast messages.

Clause 11. The apparatus of clause 9 or 10, wherein the at least one processor is configured to determine the indirect distance estimate based on two direct distance estimates made by an intervening device from the one or more intervening devices and a direct angle estimate made by the intervening device.

Clause 12. The apparatus of clause 9 or 10, wherein the at least one processor is configured to determine the indirect distance estimate based on a direct distance estimate made by an intervening device from the one or more intervening devices, an indirect distance estimate obtained by the intervening device from one or more broadcast messages, a direct angle estimate made by the intervening device, and an indirect angle estimate obtained by the intervening device from the one or more broadcast messages.

Clause 13. The apparatus of clause 9 or 10, wherein the at least one processor is configured to determine the indirect angle estimate based on two direct distance estimates made by an intervening device from the one or more intervening devices and an indirect angle estimate obtained by the first device from one or more broadcast messages.

Clause 14. The apparatus of clause 9 or 10, wherein the at least one processor is configured to determine the indirect angle estimate based on a direct angle estimate made by an intervening device from the one or more intervening devices and an indirect angle estimate obtained by the intervening device from one or more broadcast messages.

Clause 15. The apparatus of any of clauses 9-14, wherein the at least one direct distance estimate is based on one or more round trip time (RTT) measurements performed at an intervening device from the one or more intervening devices, one or more signal strength measurements performed at the intervening device, or a combination of RTT and signal strength measurements.

Clause 16. The apparatus of any of clauses 9-15, wherein the at least one direct angle estimate is based on one or more angle of arrival (AoA) measurements performed at an intervening device from the one or more intervening devices.

Clause 17. A system for position estimation, the system comprising: means for obtaining (a) at least one direct distance estimate corresponding to a distance between devices including one or more intervening devices, (b) at least one direct angle estimate corresponding to a spanning angle formed involving the one or more intervening devices, or both (a) and (b), means for, based on (a) the at least one direct distance estimate corresponding to the distance between devices including the one or more intervening devices, (b) the at least one direct angle estimate corresponding to the spanning angle formed involving the one or more intervening devices, or both (a) and (b), determining an indirect distance estimate corresponding to a distance between a first device and a second device or an indirect angle estimate corresponding to a spanning angle formed involving the first device and the second device, wherein the first device and the second device are out of range with respect to one another to make a direct distance measurement between the first device and the second device.

Clause 18. A non-transitory computer-readable medium having instructions stored therein for execution by one or more processors to perform position estimation, the instructions, when executed, causing the one or more processors to: obtain (a) at least one direct distance estimate corresponding to a distance between devices including one or more intervening devices, (b) at least one direct angle estimate corresponding to a spanning angle formed involving the one or more intervening devices, or both (a) and (b), based on (a) the at least one direct distance estimate corresponding to the distance between devices including the one or more intervening devices, (b) the at least one direct angle estimate corresponding to the spanning angle formed involving the one or more intervening devices, or both (a) and (b), determine an indirect distance estimate corresponding to a distance between a first device and a second device or an indirect angle estimate corresponding to a spanning angle formed involving the first device and the second device, wherein the first device and the second device are out of range with respect to one another to make a direct distance measurement between the first device and the second device.

Clause 19. A method for position estimation comprising: at a first device, obtaining from a second device information including (a) at least one direct distance estimate corresponding to a distance between the second device and a third device, (b) at least one direct angle estimate corresponding to a spanning angle formed involving the second device and a third device, or both (a) and (b); at the first device, determining a position estimate for the first device based on (a) the at least one direct distance estimate corresponding to the distance between the second device and the third device, (b) the at least one direct angle estimate corresponding to the spanning angle formed involving the second device and the third device, or both (a) and (b), wherein the first device and the third device are out of range with respect to one another to make a direct distance measurement between the first device and the third device Clause 20. The method of clause 19, wherein obtaining from the second device (a) the at least one direct distance estimate corresponding to the distance between the second device and the third device, (b) the at least one direct angle estimate corresponding to the spanning angle formed involving the second device and a third device, or both (a) and (b) comprises: receiving one or more broadcast messages sent from the second device; and extracting (a) the at least one direct distance estimate, (b) the at least one direct angle estimate, or both (a) and (b) from the one or more broadcast messages.

Clause 21. The method of clause 19 or 20, wherein the position estimate for the first device is determined from at least an indirect distance estimate based on two direct distance estimates made by the second device and a direct angle estimate made by the second device.

Clause 22. The method of clause 19 or 20, wherein the position estimate for the first device is determined from at least an indirect distance estimate based on a direct distance estimate made by the second device, an indirect distance estimate obtained by the second device from one or more broadcast messages, a direct angle estimate made by the second device, and an indirect angle estimate made by the second device obtained by the second device from the one or more broadcast messages.

Clause 23. The method of clause 19 or 20, wherein the position estimate for the first device is determined from at least an indirect angle estimate based on two direct distance estimates made by the second device and an indirect angle estimate obtained by the first device from one or more broadcast messages.

Clause 24. The method of clause 19 or 20, wherein the position estimate for the first device is determined from at least an indirect angle estimate based on a direct angle estimate made by the second device and an indirect angle estimate obtained by the second device from one or more broadcast message.

Clause 25. An apparatus for position estimation comprising: at least one wireless transceiver; a memory; and at least one processor communicatively coupled to the at least one wireless transceiver and the memory, wherein the at least one processor is configured to: at the first device, obtain information from a second device including (a) at least one direct distance estimate corresponding to a distance between the second device and a third device, (b) at least one direct angle estimate corresponding to a spanning angle formed involving the second device and a third device, or both (a) and (b); at the first device, determine a position estimate for the first device based on (a) the at least one direct distance estimate corresponding to the distance between the second device and the third device, (b) the at least one direct angle estimate corresponding to the spanning angle formed involving the second device and the third device, or both (a) and (b), wherein the first device and the third device are out of range with respect to one another to make a direct distance measurement between the first device and the third device.

Clause 26. The apparatus of clause 25, wherein the processor is configured to obtain from the second device (a) the at least one direct distance estimate corresponding to the distance between the second device and the third device, (b) the at least one direct angle estimate corresponding to the spanning angle formed involving the second device and a third device, or both (a) and (b) by: receiving one or more broadcast messages sent from the second device; and extracting (a) the at least one direct distance estimate, (b) the at least one direct angle estimate, or both (a) and (b) from the one or more broadcast messages.

Clause 27. The apparatus of clause 25 or 26, wherein the processor is configured to determine the position estimate for the first device from at least an indirect distance estimate based on two direct distance estimates made by the second device and a direct angle estimate made by the second device.

Clause 28. The apparatus of clause 25 or 26, wherein the processor is configured to determine the position estimate for the first device from at least an indirect distance estimate based on a direct distance estimate made by the second device, an indirect distance estimate obtained by the second device from one or more broadcast messages, a direct angle estimate made by the second device, and an indirect angle estimate made by the second device obtained by the second device from the one or more broadcast messages.

Clause 29. The apparatus of clause 25 or 26, wherein the processor is configured to determine the position estimate for the first device from at least an indirect angle estimate based on two direct distance estimates made by the second device and an indirect angle estimate obtained by the first device from one or more broadcast messages.

Clause 30. The apparatus of clause 25 or 26, wherein the processor is configured to determine the position estimate for the first device from at least an indirect angle estimate based on a direct angle estimate made by the second device and an indirect angle estimate obtained by the second device from one or more broadcast message.

Clause 31. A method for position estimate comprising: (a) determining one or more direct distance estimates, each of the one or more direct distance estimates corresponding to a distance to one of one or more neighboring devices; (b) determining one or more direct angle estimates, each of the one or more direct angle estimates corresponding to an angle formed between a pair of neighboring devices from one or more pairs of neighboring devices; (c) receiving at least one broadcast message from the one or more neighboring devices; (d) extracting one or more indirect distance estimates and one or more indirect angle estimates from the at least one broadcast message received from the one or more neighboring devices; (e) updating a local table with (i) the one or more direct distance estimates, (ii) the one or more direct angle estimates, (iii) the one or more indirect distance estimates, and (iv) the one or more indirect angle estimates; (f) broadcasting the local table to the one or more neighboring devices; and (g) repeatedly performing steps (a)-(f).

Clause 32. An apparatus for position estimation comprising: at least one wireless transceiver; a memory; and at least one processor communicatively coupled to the at least one wireless transceiver and the memory, wherein the at least one processor is configured to: (a) determine one or more direct distance estimates, each of the one or more direct distance estimates corresponding to a distance to one of one or more neighboring devices; (b) determine one or more direct angle estimates, each of the one or more direct angle estimates corresponding to an angle formed between a pair of neighboring devices from one or more pairs of neighboring devices; (c) receive at least one broadcast message from the one or more neighboring devices; (d) extract one or more indirect distance estimates and one or more indirect angle estimates from the at least one broadcast message received from the one or more neighboring devices; (e) update a local table with (i) the one or more direct distance estimates, (ii) the one or more direct angle estimates, (iii) the one or more indirect distance estimates, and (iv) the one or more indirect angle estimates; (f) broadcast the local table to the one or more neighboring devices; and (g) repeatedly perform steps (a)-(f).

Clause 33. A system for position estimation comprising: (a) means for determining one or more direct distance estimates, each of the one or more direct distance estimates corresponding to a distance to one of one or more neighboring devices; (b) means for determining one or more direct angle estimates, each of the one or more direct angle estimates corresponding to an angle formed between a pair of neighboring devices from one or more pairs of neighboring devices; (c) means for receiving at least one broadcast message from the one or more neighboring devices; (d) means for extracting one or more indirect distance estimates and one or more indirect angle estimates from the at least one broadcast message received from the one or more neighboring devices; (e) means for updating a local table with (i) the one or more direct distance estimates, (ii) the one or more direct angle estimates, (iii) the one or more indirect distance estimates, and (iv) the one or more indirect angle estimates; (f) means for broadcasting the local table to the one or more neighboring devices; and (g) means for repeatedly performing steps (a)-(f).

Clause 34. A non-transitory computer-readable medium having instructions stored therein for execution by one or more processors, the instructions, when executed, causing the one or more processors to: (a) determine one or more direct distance estimates, each of the one or more direct distance estimates corresponding to a distance to one of one or more neighboring devices; (b) determine one or more direct angle estimates, each of the one or more direct angle estimates corresponding to an angle formed between a pair of neighboring devices from one or more pairs of neighboring devices; (c) receive at least one broadcast message from the one or more neighboring devices; (d) extract one or more indirect distance estimates and one or more indirect angle estimates from the at least one broadcast message received from the one or more neighboring devices; (e) update a local table with (i) the one or more direct distance estimates, (ii) the one or more direct angle estimates, (iii) the one or more indirect distance estimates, and (iv) the one or more indirect angle estimates; (f) broadcast the local table to the one or more neighboring devices; and (g) repeatedly perform steps (a)-(f).

Clause 35. A method for position estimation for a first device comprising: (a) obtaining a distance estimate and an angle of arrival estimate associated with one or more signals transmitted between the first device and a second device; (b) obtaining a position estimate for the second device; (c) determining a position estimate for the first device based on (i) the distance estimate and the angle of arrival estimate associated with the one or more signals transmitted between the first device and the second device and (ii) the position estimate for the second device, wherein the position estimate for the second device is based on (i) a distance estimate and an angle of arrival estimate associated with one or more signals transmitted between the second device and a third device and (ii) a position estimate for the third device.

Clause 36. The method of clause 35, wherein the distance estimate associated with the one or more signals transmitted between the first device and the second device is obtained from one or more round trip time (RTT) measurements, one or more signal strength measurements, or a combination of RTT and signal strength measurements.

Clause 37. The method of clause 35 or 36, wherein the angle of arrival estimate associated with the one or more signals transmitted between the first device and the second device is obtained from one or more angle of arrival (AoA) measurements.

Clause 38. The method of any of clauses 35-37, wherein: the steps (a), (b), and (c) are performed in succession for each device in a plurality of devices; the position estimate for each device in the plurality of devices is determined based on (i) a distance estimate and an angle of arrival estimate associated with one or more signals transmitted between the device and a previous device and (ii) a position estimate for the previous device.

Clause 39. The method of any of clauses 35-38, wherein the steps (a), (b), and (c) are performed at the first device.

Clause 40. The method of any of clauses 35-38, wherein the steps (a), (b), and (c) are performed at the second device.

Clause 41. The method of any of clauses 35-40, wherein the position estimate for the second device is obtained from a payload of one or more broadcast messages sent from the second device.

Clause 42. The method of any of clauses 35-40, wherein the position estimate for the second device is obtained from a payload of a one-to-one communication message sent from the second device.

Clause 43. An apparatus for position estimation for a first device comprising: at least one wireless transceiver; a memory; and at least one processor communicatively coupled to the at least one wireless transceiver and the memory, wherein the at least one processor is configured to: (a) obtain a distance estimate and an angle of arrival estimate associated with one or more signals transmitted between the first device and a second device; (b) obtain a position estimate for the second device; (c) determine a position estimate for the first device based on (i) the distance estimate and the angle of arrival estimate associated with the one or more signals transmitted between the first device and the second device and (ii) the position estimate for the second device, wherein the position estimate for the second device is based on (i) a distance estimate and an angle of arrival estimate associated with one or more signals transmitted between the second device and a third device and (ii) a position estimate for the third device.

Clause 44. The apparatus of clause 43, wherein: the processor is configured to perform the steps (a), (b), and (c) in succession for each device in a plurality of devices; the position estimate for each device in the plurality of devices is determined based on the position estimate for a previous device and the angle estimate and distance estimate corresponding to one or more signals transmitted between the device and the previous device.

Clause 45. A system for position estimation for a first device comprising: (a) means for obtaining a distance estimate and an angle of arrival estimate associated with one or more signals transmitted between the first device and a second device; (b) means for obtaining a position estimate for the second device; (c) means for determining a position estimate for the first device based on (i) the distance estimate and the angle of arrival estimate associated with the one or more signals transmitted between the first device and the second device and (ii) the position estimate for the second device, wherein the position estimate for the second device is based on (i) a distance estimate and an angle of arrival estimate associated with one or more signals transmitted between the second device and a third device and (ii) a position estimate for the third device.

Clause 46. A non-transitory computer-readable medium having instructions stored therein for execution by one or more processors, the instructions, when executed, causing the one or more processors to: (a) obtain a distance estimate and an angle of arrival estimate associated with one or more signals transmitted between a first device and a second device; (b) obtain a position estimate for the second device; (c) determine a position estimate for the first device based on (i) the distance estimate and the angle of arrival estimate associated with the one or more signals transmitted between the first device and the second device and (ii) the position estimate for the second device, wherein the position estimate for the second device is based on (i) a distance estimate and an angle of arrival estimate associated with one or more signals transmitted between the second device and a third device and (ii) a position estimate for the third device.

Clause 47. A method for position estimation for a first device comprising: (a) at the first device, obtaining a distance estimate and an angle of arrival estimate associated with one or more signals transmitted between the first device and a second device; (b) at the first device, obtaining a position estimate for the second device; (c) at the first device, determining a position estimate for the first device based on (i) the distance estimate and the angle of arrival estimate associated with the one or more signals transmitted between the first device and the second device and (ii) the position estimate for the second device, wherein the position estimate for the second device is based on (i) a distance estimate and an angle of arrival estimate associated with one or more signals transmitted between the second device and a third device and (ii) a position estimate for the third device.

Clause 48. The method of clause 47, wherein: the distance estimate associated with the one or more signals transmitted between the first device and the second device is obtained from one or more round trip time (RTT) measurements, one or more signal strength measurements, or a combination of RTT and signal strength measurements, and the angle of arrival estimate associated with the one or more signals transmitted between the first device and the second device is obtained from one or more angle of arrival (AoA) measurements.

Clause 49. The method of clause 47 or 48, wherein: the steps (a), (b), and (c) are performed in succession for each device in a plurality of devices, including the first device; the position estimate for each device in the plurality of devices is determined based on (i) a distance estimate and an angle of arrival estimate associated with one or more signals transmitted between the device and a previous device and (ii) a position estimate for the previous device Clause 50. The method of any of clauses 47-49, wherein the position estimate for the second device is obtained from a payload of one or more broadcast messages sent from the second device.

Clause 51. The method of any of clauses 47-49, wherein the position estimate for the second device is obtained from a payload of a one-to-one communication message sent from the second device.

Clause 52. An apparatus for position estimation for a first device comprising: at least one wireless transceiver; a memory; and at least one processor communicatively coupled to the at least one wireless transceiver and the memory, wherein the at least one processor is configured to: (a) at the first device, obtain a distance estimate and an angle of arrival estimate associated with one or more signals transmitted between the first device and a second device; (b) at the first device, obtain a position estimate for the second device; (c) at the first device, determine a position estimate for the first device based on (i) the distance estimate and the angle of arrival estimate associated with the one or more signals transmitted between the first device and the second device and (ii) the position estimate for the second device, wherein the position estimate for the second device is based on (i) a distance estimate and an angle of arrival estimate associated with one or more signals transmitted between the second device and a third device and (ii) a position estimate for the third device.

Clause 53. The apparatus of clause 52, wherein the processor is configured to: obtain the distance estimate associated with the one or more signals transmitted between the first device and the second device from one or more round trip time (RTT) measurements, one or more signal strength measurements, or a combination of RTT and signal strength measurements, and obtain the angle of arrival estimate associated with the one or more signals transmitted between the first device and the second device from one or more angle of arrival (AoA) measurements.

Clause 54. The apparatus of clause 52 or 53, wherein: a plurality of devices, including the first device, are configured to perform the steps (a), (b), and (c) in succession; each device in the plurality of devices is configured to determine the position estimate for the device based on (i) a distance estimate and an angle of arrival estimate associated with one or more signals transmitted between the device and a previous device and (ii) a position estimate for the previous device.

Clause 55. The apparatus of any of clauses 52-54, wherein the processor is configured to obtain the position estimate for the second device from a payload of one or more broadcast messages sent from the second device.

Clause 56. The apparatus of any of clauses 52-54, wherein the processor is configured to obtain the position estimate for the second device from a payload of a one-to-one communication message sent from the second device.

What is claimed is:

1. A method for position estimation, the method comprising:
   obtaining (a) at least one direct distance estimate corresponding to a distance between devices including one or more intervening devices, (b) at least one direct angle estimate corresponding to a spanning angle formed involving the one or more intervening devices, or both (a) and (b),
   based on (a) the at least one direct distance estimate corresponding to the distance between devices including the one or more intervening devices, (b) the at least one direct angle estimate corresponding to the spanning angle formed involving the one or more intervening devices, or both (a) and (b), determining an indirect distance estimate corresponding to a distance between a first device and a second device or an indirect angle estimate corresponding to a spanning angle formed involving the first device and the second device,
   wherein the first device and the second device are out of range with respect to one another to make a direct distance measurement between the first device and the second device,
   wherein the indirect distance estimate is determined based on a direct distance estimate made by an intervening device from the one or more intervening devices, an indirect distance estimate obtained by the intervening device from one or more broadcast messages, a direct angle estimate made by the intervening device, and an indirect angle estimate obtained by the intervening device from the one or more broadcast messages.

2. The method of claim 1, wherein obtaining (a) the at least one direct distance estimate, (b) the at least one direct angle estimate, or both (a) and (b) comprises:
   receiving one or more broadcast messages sent from at least one of the one or more intervening devices; and
   extracting (a) the at least one direct distance estimate, (b) the at least one direct angle estimate, or both (a) and (b) from the one or more broadcast messages.

3. The method of claim 1, wherein the indirect distance estimate is determined based on two direct distance estimates made by an intervening device from the one or more intervening devices and a direct angle estimate made by the intervening device.

4. The method of claim 1, wherein the indirect angle estimate is determined based on two direct distance estimates made by an intervening device from the one or more intervening devices and an indirect angle estimate obtained by the first device from one or more broadcast messages.

5. The method of claim 1, wherein the indirect angle estimate is determined based on a direct angle estimate made by an intervening device from the one or more intervening devices and an indirect angle estimate obtained by the intervening device from one or more broadcast messages.

6. The method of claim 1, wherein the at least one direct distance estimate is based on one or more round trip time (RTT) measurements performed at an intervening device from the one or more intervening devices, one or more signal strength measurements performed at the intervening device, or a combination of RTT and signal strength measurements.

7. The method of claim 1, wherein the at least one direct angle estimate is based on one or more angle of arrival (AoA) measurements performed at an intervening device from the one or more intervening devices.

8. An apparatus for position estimation, the apparatus comprising:
   at least one wireless transceiver;
   a memory; and
   at least one processor communicatively coupled to the at least one wireless transceiver and the memory, wherein the at least one processor is configured to:
     obtain (a) at least one direct distance estimate corresponding to a distance between devices including one or more intervening devices, (b) at least one direct angle estimate corresponding to a spanning angle formed involving the one or more intervening devices, or both (a) and (b),
     based on (a) the at least one direct distance estimate corresponding to the distance between devices including the one or more intervening devices, (b) the at least one direct angle estimate corresponding to the spanning angle formed involving the one or more intervening devices, or both (a) and (b), determine an indirect distance estimate corresponding to a distance between a first device and a second device or an indirect angle estimate corresponding to a spanning angle formed involving the first device and the second device, wherein the first device and the second device are out of range with respect to one another to make a direct distance measurement between the first device and the second device, wherein the indirect distance estimate is determined based on a direct distance estimate made by an intervening device from the one or more intervening devices, an indirect distance estimate obtained by the intervening device from one or more broadcast messages, a direct angle estimate made by the intervening device, and an indirect angle estimate obtained by the intervening device from the one or more broadcast messages.

9. The apparatus of claim 8, wherein the at least one processor is configured to obtain (a) the at least one direct distance estimate, (b) the at least one direct angle estimate, or both (a) and (b) by being configured to:

receive one or more broadcast messages sent from at least one of the one or more intervening devices; and extract (a) the at least one direct distance estimate, (b) the at least one direct angle estimate, or both (a) and (b) from the one or more broadcast messages.

10. The apparatus of claim 8, wherein the at least one processor is configured to determine the indirect distance estimate based on two direct distance estimates made by an intervening device from the one or more intervening devices and a direct angle estimate made by the intervening device.

11. The apparatus of claim 8, wherein the at least one processor is configured to determine the indirect angle estimate based on two direct distance estimates made by an intervening device from the one or more intervening devices and an indirect angle estimate obtained by the first device from one or more broadcast messages.

12. The apparatus of claim 8, wherein the at least one processor is configured to determine the indirect angle estimate based on a direct angle estimate made by an intervening device from the one or more intervening devices and an indirect angle estimate obtained by the intervening device from one or more broadcast messages.

13. The apparatus of claim 8, wherein the at least one direct distance estimate is based on one or more round trip time (RTT) measurements performed at an intervening device from the one or more intervening devices, one or more signal strength measurements performed at the intervening device, or a combination of RTT and signal strength measurements.

14. The apparatus of claim 8, wherein the at least one direct angle estimate is based on one or more angle of arrival (AoA) measurements performed at an intervening device from the one or more intervening devices.

* * * * *